United States Patent [19]

Maeoka et al.

[11] Patent Number: 5,214,634
[45] Date of Patent: May 25, 1993

[54] OPTICAL DISC APPARATUS FOR RECORDING AND REPRODUCING SIGNALS ON BOTH SURFACES OF A DISK WITH A SINGLE OPTICAL PICKUP

[75] Inventors: Tadashi Maeoka, Hirakata; Yukihiro Fukushima, Ikoma; Masaki Kondo, Takatsuki, all of Japan

[73] Assignee: Matsushita Electric Industrial Co., Ltd., Osaka, Japan

[21] Appl. No.: 656,767

[22] Filed: Feb. 15, 1991

[30] Foreign Application Priority Data

Feb. 23, 1990 [JP] Japan ................................. 2-043038
Feb. 23, 1990 [JP] Japan ................................. 2-043039

[51] Int. Cl.[5] .............................................. G11B 21/04
[52] U.S. Cl. ...................................... 369/195; 369/77.2
[58] Field of Search ................ 369/32, 195, 199, 200, 369/77.1, 77.2, 249, 219, 220

[56] References Cited

U.S. PATENT DOCUMENTS

| | | | |
|---|---|---|---|
| 4,216,969 | 8/1990 | Allen ................................. | 369/77.2 |
| 4,839,881 | 6/1989 | Takahara et al. .................. | 369/195 |
| 4,903,140 | 2/1990 | Okamoto et al. .................. | 369/32 |
| 4,953,154 | 8/1990 | Takahara et al. .................. | 369/195 |

FOREIGN PATENT DOCUMENTS

| | | |
|---|---|---|
| 56-123072 | 9/1981 | Japan . |
| 62-287476 | 12/1987 | Japan . |
| 2-66729 | 3/1990 | Japan . |
| 3-108164 | 5/1991 | Japan . |

*Primary Examiner*—Aristotelis Psitos
*Attorney, Agent, or Firm*—Stevens, Davis, Miller & Mosher

[57] ABSTRACT

An optical disk apparatus for a double-sided optical disk has an optical pickup unit for reproducing information from the optical disk, and base members carrying driving unit for shifting the pickup unit and a guide mechanism for guiding the movement of the pickup unit. The drive of the pickup unit is conducted through a timing belt, and different reduction systems are used for reproducing operation of the optical pickup unit and for the shifting of the optical pickup unit from one to the other sides of the disk, by the operation of a switching mechanism for effecting switching between these reduction systems, such that, during the reproduction, the optical pickup unit is moved finely to provide a high resolution, whereas the shifting of the optical pickup unit from one to the other side of the disk is effected at a high speed. The motor as the power source therefore can operate at a low speed, thus reducing levels of vibration and noise.

12 Claims, 9 Drawing Sheets

OPTICAL DISC APPARATUS FOR RECORDING AND REPRODUCING SIGNALS ON BOTH SURFACES OF A DISK WITH A SINGLE OPTICAL PICKUP

BACKGROUND OF THE INVENTION

The present invention relates to an optical disk apparatus for recording and/or reproducing information signal onto and from at least one side of a double-sided optical disk.

FIG. 12 schematically shows the construction of a conventional optical disk player for reproducing information from both sides, i.e., side A and side B, of an optical disk (referred to simply as "disk", hereinafter). Referring to FIG. 12, signals representing information are recorded both in the side A and the side B of a disk 100. During reproduction from the side A, an optical block 102 carrying an optical pickup 101 for reproducing signals moves in the radial direction of the disk (direction perpendicular to the plane of sheet of the drawing), while being guided by a guide shaft 104 provided on a main base member 103 and under a position control performed by a cooperation between a rotatable roller 105 on the optical block and a roller control member 106 provided on the main base member 103. The power for radially driving the optical block 102 is produced by a motor carried by the optical block 102. The power is transmitted through a plurality of reduction gears (not shown) to a drive gear 107 which meshes with teeth on a rack member 108 fixed to the main base member 103. That is, the optical block 102 propels itself. On the other hand, during reproduction from the side B, an optical block 102 moves in the radial direction of the disk while being guided and restricted by a guide shaft 110 provided on a sub-base member 109 fixed to the main base member 103 and by a roller control member 111.

This known arrangement suffers from the following disadvantage. Namely, since the optical block 102 during reproduction from the side B is guided by the guide shaft which is carried by the sub-base member 102, the positional precision of the optical block 102 during reproduction from the side B tends to be impaired due to, for example, dimensional error or warp of the sub-base itself or error of mounting of the sub-base member 109 on the main base member 103 on which the guide shaft for the reproduction from the side A is mounted. This often results in a serious difference between the reproducing performance for the side A and that for the side B. Furthermore, since the optical block 102 carries a self-propelling mechanism, the size of the optical block 102 and, hence, the size of the whole apparatus are increased. In addition, an increase in the motor speed for the purpose of attaining a higher moving speed of the optical block 102 raises the levels of noise and vibration, with the result that the reproducing performance, as well as the quality of operation, is impaired.

SUMMARY OF THE INVENTION

Accordingly, an object of the present invention is to provide an optical disk apparatus which is improved to achieve a high precision of position control of an optical block both for side A and side B, while enabling a reduction in the size of the apparatus and lowering levels of noise and vibration, thereby overcoming the above-described problems of the prior art.

To this end, according to the present invention, there is provided an optical disk apparatus comprising: optical pickup means for recording or reproducing information signals onto or from at least one of first and second sides of a disk-type recording medium; disk driving means for rotatingly driving the disk-type recording medium; pickup moving means for effecting radial movement of the optical pickup means at each of the first and second sides and also a movement of the optical pickup mean from the first side to the second side of the disk-type recording medium and vice versa; first guiding means for guiding the movement of the optical pickup means along the first side of the disk type recording medium between the inner and outer peripheral ends of the disk-type recording medium; second guiding means for guiding the movement of the optical pickup means along the second side of the disk-type recording medium between the inner and outer peripheral ends of the disk-type recording medium; a first base member carrying the first and second guiding means; and a second base member snugly fixed to the first base member and having a guide groove for guiding the movement of the optical pickup means.

In a preferred embodiment form of the present invention, the pickup moving means includes a flexible power transmission member for transmitting a power to the optical pickup means, a connecting member for connecting the optical pickup means and the flexible power transmitting member to each other, a driving pulley provided on the first base member and adapted for driving the flexible power transmission member, at least one idle pulley for changing the running direction of the flexible power transmission member, a feed motor provided on the first base member, and a speed reduction means for transmitting the power of the feed motor to the driving pulley.

With these features, the optical disk reproducing apparatus of the present invention offers a high precision in the position control of the optical block both for the side A and the side B, thus eliminating any difference in the reproduction performance between both sides. In addition, the size of the apparatus can be reduced and the levels of vibration and noise are lowered.

BRIEF DESCRIPTION OF THE DRAWINGS

The present invention will be detailed in the following description of a preferred embodiment taken in conjunction with the accompanying drawings in which.

DESCRIPTION OF THE PREFERRED EMBODIMENT

Figure 1:
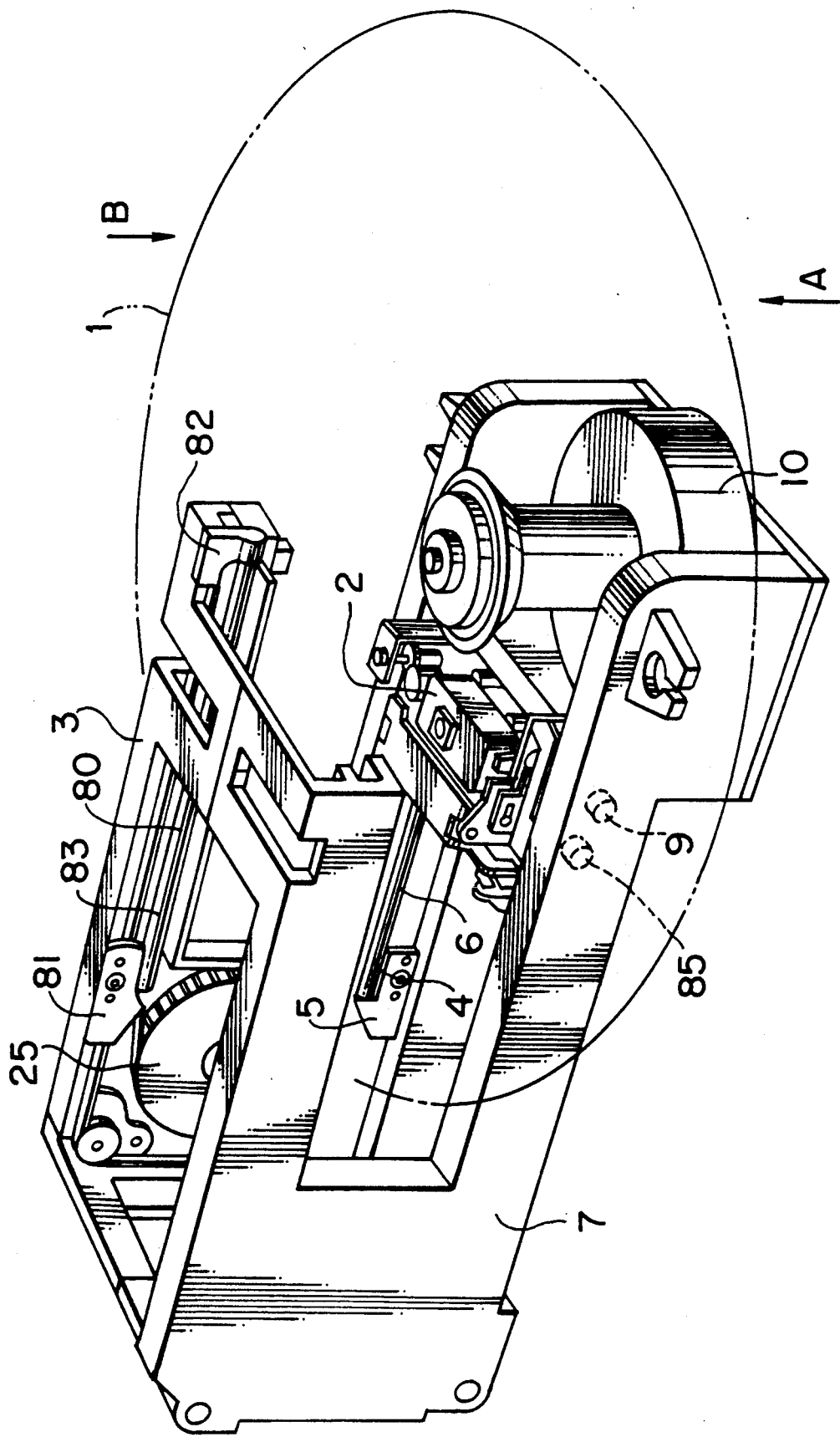
FIG. 1 is a perspective view of a critical portion of the optical disk apparatus embodying the present invention.

A preferred embodiment of the optical disk reproducing apparatus of the present invention will be described with reference to the drawings.

Referring to FIGS. 1 to 4, the optical disk reproducing apparatus of the present invention has an optical pickup means 2 for reproducing information from a double-sided disk 1 having two recording surfaces: namely, a first side which is visible when viewed in the direction of an arrow A and a second side which is visible when viewed in the direction of an arrow B. During reproduction of information from the first side, optical pickup means 2 moves in the radial direction of the disk 1, while being guided by a first guide means 6 composed of a first guide shaft 4 secured to a first base member 3 and a first shaft holding member 5 which has a tapered portion, and while being restricted by a cooperation between a first groove 8 formed in a second base member 7 fixed to the first base member 3 and a first roller member 9 provided on the optical pickup means 2. A disk driving means 10 for rotatingly driving the disk is disposed between the first guide means and a second guide member 7. The first guide means 6 is located on the first base member by a cooperation between locating holes 11, 12 formed in the first shaft holding member 5 and locating projections 13, 14 on the first base member 3 and also by a locating groove 15 formed in the base member 3. The first guide means 6 is fastened to the first base member 3 by a fastening member 16. The movement of the optical pickup means 2 is effected by a power which is transmitted through a flexible power transmission member 17 such as a timing belt provided on the first base member 3. Namely, the optical pickup means 2 is connected to the flexible power transmitting member 17 through a connecting member 18 provided on the flexible power transmission member 17, so that the optical pickup means 2 is moved as the flexible power transmission member 17 is driven.

Figure 2:
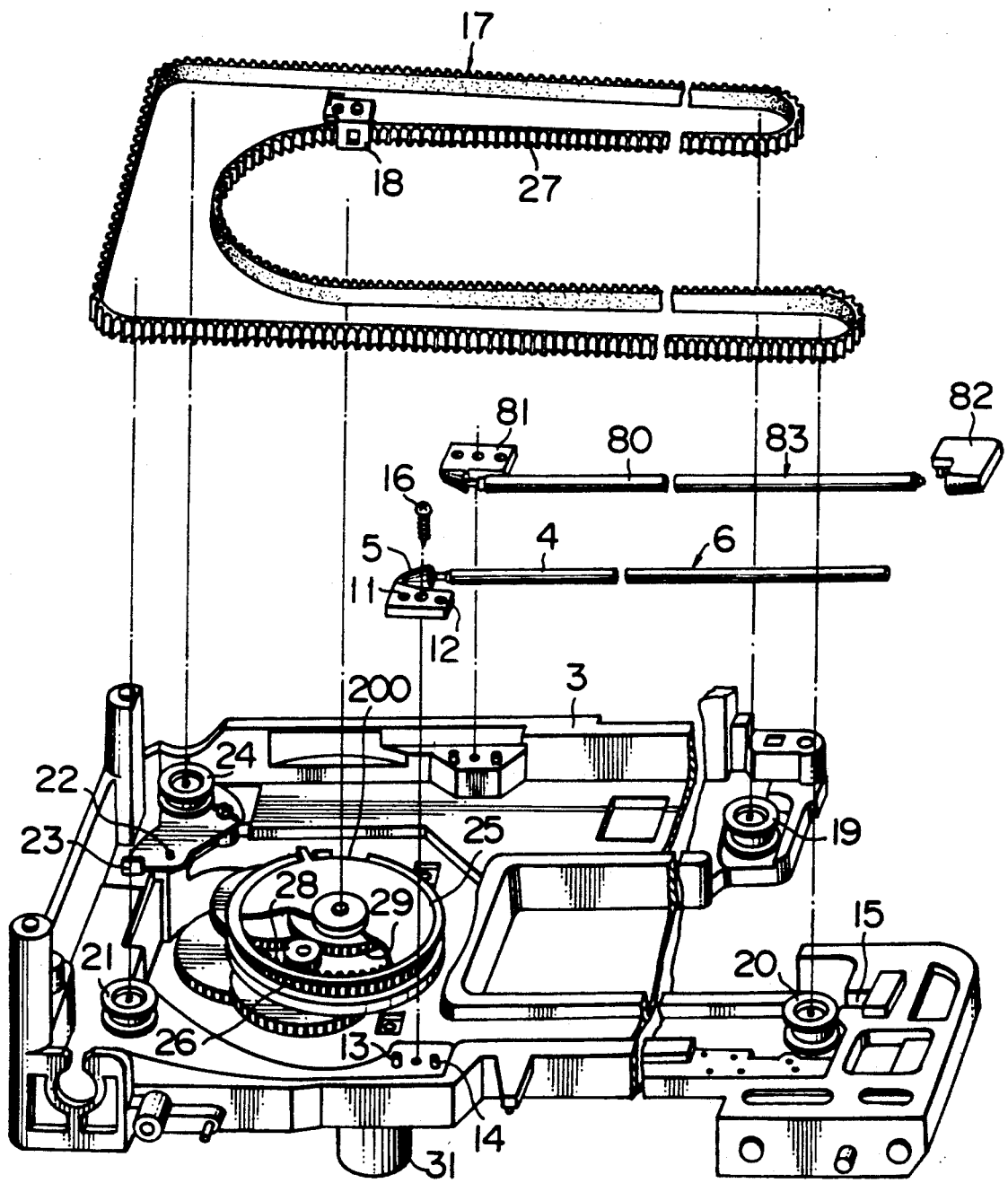
FIG. 2 is an exploded perspective view illustrating the internal structure of a first base member.
Figure 3:
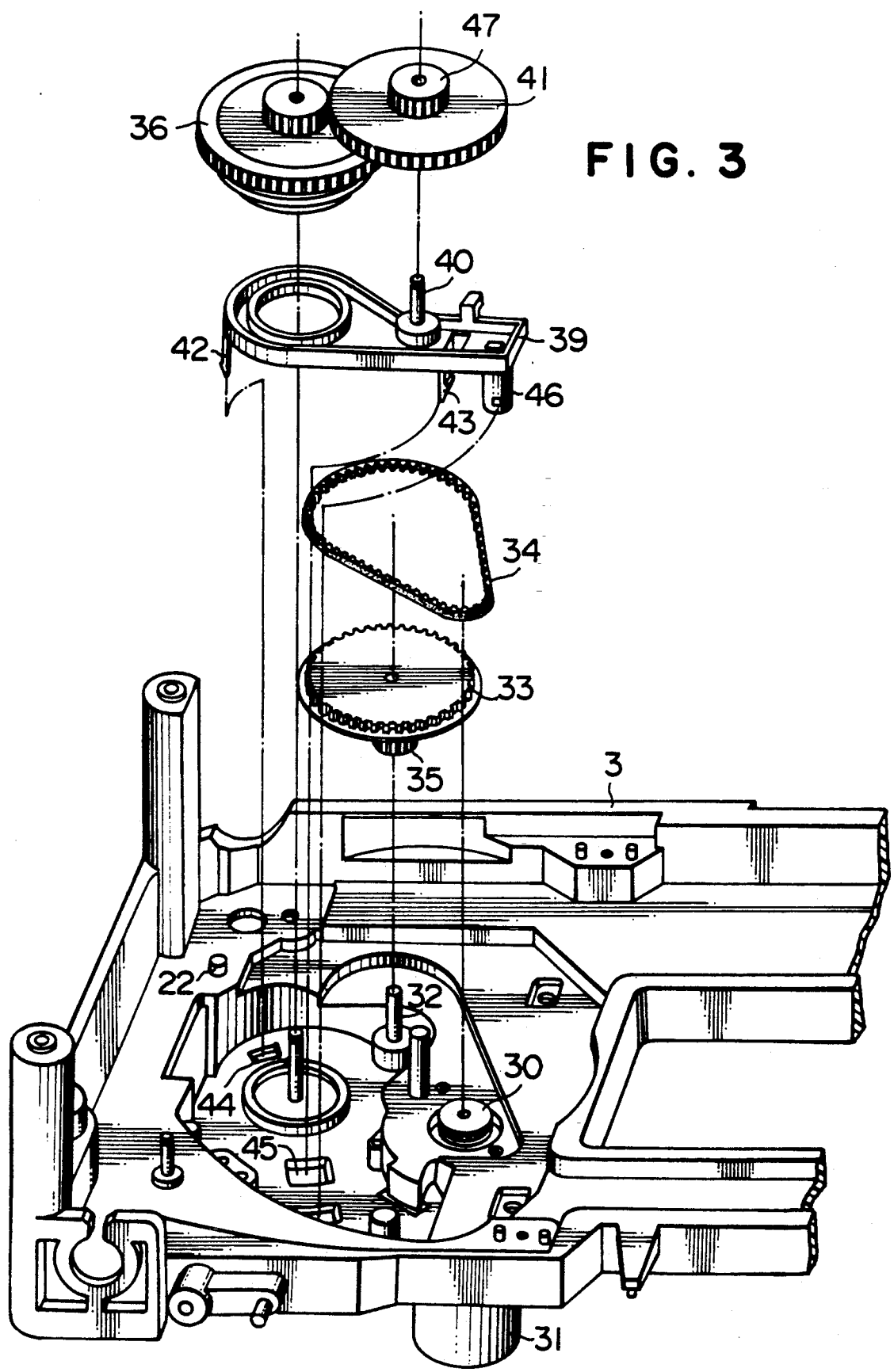
FIG. 3 is an exploded perspective view showing a driving portion in the first base member.
Figure 4:
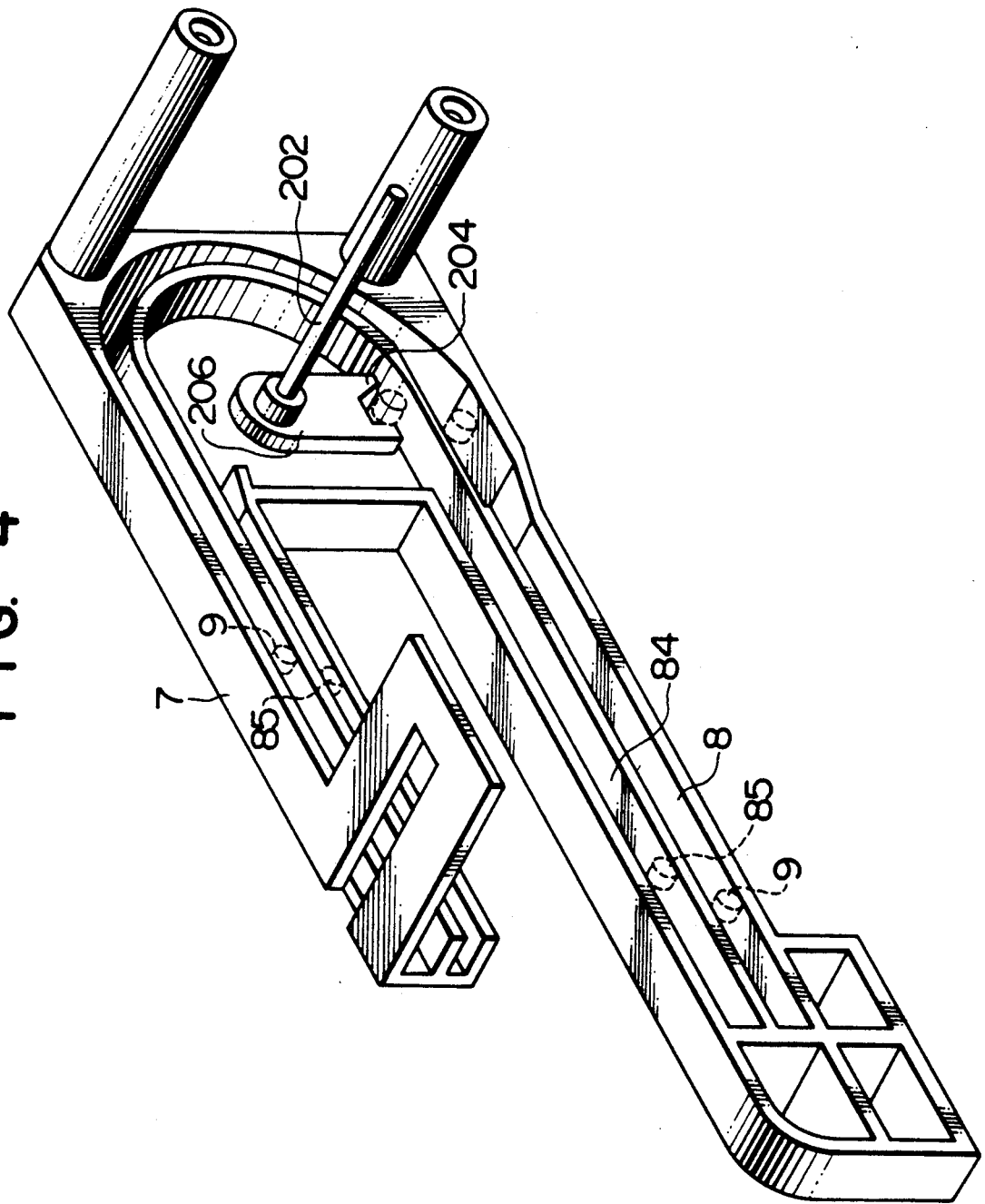
FIG. 4 is a perspective view showing the internal structure of a second base.

As will be seen from FIG. 2, the flexible power transmission member 17 is stretched around three rotatable belt rollers 19, 20, 21 provided on the first base member 3 and a tension adjusting roller 24 provided on a tension adjusting means 23 pivotable on a shaft 22 mounted on the first base member 3, and is driven by a driving pulley 25.

On the other hand, during reproduction of information from the second side, the optical pickup means moves in the radial direction of the disk 1 while being guided by a second guide means 83 composed of a second guide shaft 80 secured to the first base member 3, a second shaft holding member 81 and a third shaft holding member 82 and being restricted through a cooperation between a second groove 84 formed in the second base member 7 and a second roller 85 provided on the optical pickup means 2.

During switching of the optical pickup means 2 from the state of reproduction from the first side to the state of reproduction from the second side, the connecting member 18 through which the optical pickup means 2 is connected to the flexible power transmission member 17 moves into one of the recesses 200 formed in the driving pulley 25. At the same time, the second roller 85 provided on the optical pickup means 2 is held by a transmission arm 206 which is rotatable together with the drive pulley 25 through a transmission shaft 202 (see FIG. 4) and which is provided with a notch 204 for engaging with the second roller 85. Thus, the switching is effected in a quite smooth manner.

Consecutive crests and valleys 26 are formed on the outer peripheral surface of the driving pulley 25 for engagement with valleys and crests 27 formed on the flexible transmission member 17. The driving gear 25 is also provided with a first toothed portion 28 provided on the inner peripheral surface thereof opposite to the surface carrying the crests and valleys 26, and also with a second toothed portion 29 on a circular portion concentric with the first toothed portion 28. As will be seen from FIGS. 2 and 3, the driving pulley 25 is driven by a mechanism which includes a feed motor member 31 which is carried by the first base member 3 and which is provided with a motor pulley 30, a pulley gear 33 rotatable on a shaft 32 provided on the first base member 3, a belt 34 for transmitting the torque of the motor pulley 30 to the pulley gear 33, and an intermediate gear 36 meshing with a gear portion 35 formed on the pulley gear 33 and rotatable on a shaft 37 provided on the first base member 3. An annular protrusion 38 concentric with the shaft 37 is formed on the first base member 3. A switching lever 39 is carried for rotation on a shaft 40 provided on the first base member 3 so as to fit to the annular protrusion 38. A switching gear 41 is disposed so as to engage with the intermediate gear 36. The switching lever 39 is provided with a pair of anchoring portions 42, 43 which are anchored in holes 44, 45 of the first base member when mounted. Furthermore, a driving projection 46 for driving the switching lever 39 is provided on this lever 39.

Figure 5:
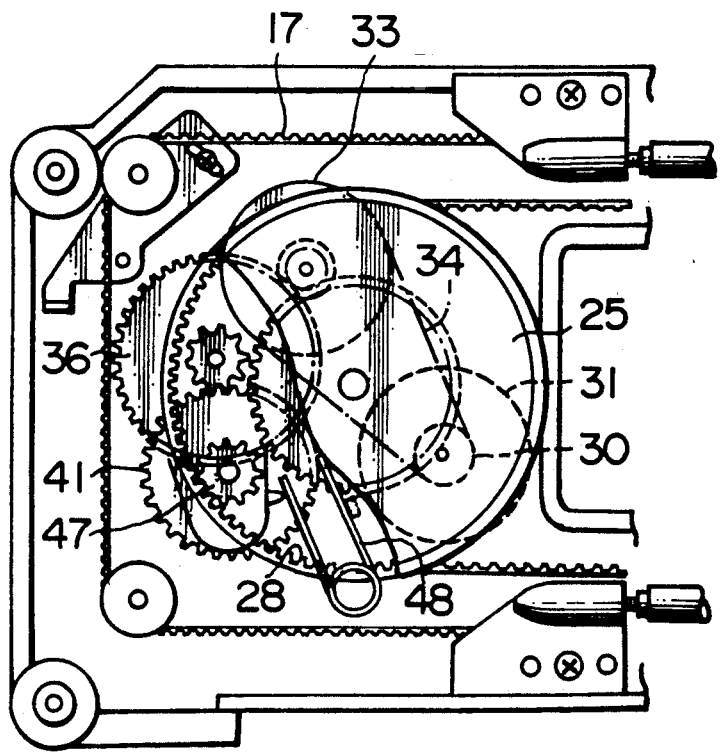
FIG. 5 is a plan view showing the state of the driving portion during reproduction from the side A or B.

FIG. 5 shows the driving portion in a state for reproduction from the first or the second side of the disk. The torque of the feed motor member 31 provided on the first base member 3 is transmitted to the switching gear 41 through the motor pulley 30, the belt 34, the pulley gear 33 and the intermediate gear 36. The gear portion 47 formed on the switching gear 41 meshes with the first toothed portion 28 of the driving pulley 25 as a result of urging of the switching lever 39 by urging means 43 provided on the first base member 3, whereby the driving pulley 25 is driven to cause a movement of the optical pickup means 2 through the flexible transmission member 17 engaging with the driving pulley 25.

Figure 6:
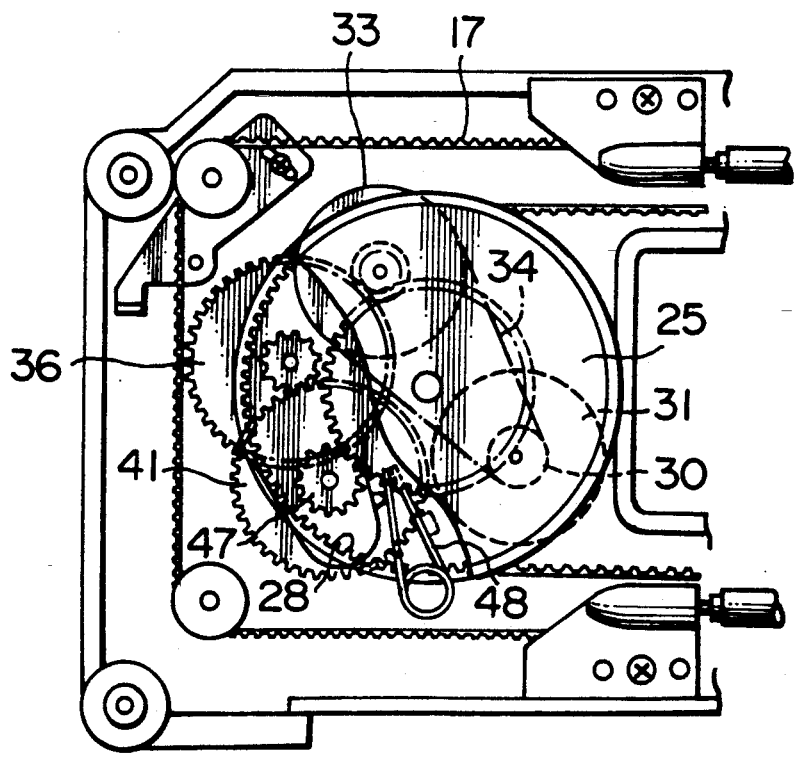
FIG. 6 is a plan view of the driving portion during shifting of an optical pickup means from the side A to the side B or vice versa.

FIG. 6 shows the driving portion in a state for causing the optical pickup means to move from the first side to the second side or vice versa. The torque of the feed motor member 31 provided on the first base member 3 is transmitted to the switching gear 41 through the motor pulley 30, the belt 34, the pulley gear 33 and through the intermediate gear 36. The gear portion 47 provided on the switching gear 41 serves to rotate the switching lever 39 counterclockwise by the action of the switch driving means 49 shown in FIG. 7, through the driving projection 46, against the force of the urging means 48 provided on the first base member 3. As a result, the gear portion 47 of the switching gear 41 engages with the second toothed portion 29 of the driving pulley 25 so as to drive this pulley 25, whereby the optical pickup means 2 is moved through the action of the flexible transmission means 17 engaging with the driving pulley 25.

The switch driving means 49 mentioned before forms a part of a loading mechanism which moves a tray (not shown) for carrying and conveying the disk to a reproducing position. The loading mechanism has a loading motor 50 the torque of which is transmitted through reduction members 51, 52, 53, 54 to a loading driving member 55 for driving the tray. The loading driving member 55 has a cam portion 56 which cooperates with a cam follower 57 provided on a driving plate 59 which is rotatable about a fulcrum 58. A spring 60 is stretched between the driving plate 59 and the driving projection 46. The arrangement is such that, when the optical pickup means 2 is switched from the state for reproduction from the first side to the state for reproduction from the second side or vice versa, the loading driving member 55 is rotated to cause the driving projection 46 to move in the direction of an arrow X.

A description will be given of the optical pickup means 2, with specific reference to FIGS. 8 to 11 which show the optical pickup means incorporated in the described embodiment of the optical disk reproducing apparatus of the invention.

The optical pickup means 2 includes a base 212 which carries an optical pickup member 210 for picking up signals from the disk and a tilt sensor for sensing the angle of tilt of the disk 1 with respect to the optical axis of the optical pickup member 210. As will be seen from FIG. 10, first and second support shafts 213 and 214 are formed on opposite end surfaces of the base 212 so as to extend perpendicularly to the optical axis. The base 12 has a pick base member 216 provided with a bearing portion 315 for bearing the first and second guide shafts and 80. A pickup base member 216 has a pair of elongated slots 217, 218. The slot 217 receives the first and second support shafts 213, 214 provided on the base 12. A base shaft connecting member 221 is pivotable about fulcrums 219 and 220 on the pickup base member 216. The base shaft connecting member 271 is provided with notches A and B (both not shown). These notches engage with the first and the second support shafts 213 and 214 so as to enable the base 212 to move up and down.

The pickup base member carries a motor 224 having a worm 223 attached thereto, a worm wheel 226 meshing with the worm 23 and having a screw shaft 225 press-fitted thereto, a pair of bearings 227 (only one of them is shown) for supporting both ends of the screw shaft 225, and a vertical base plate 229 provided with a driving plate 228 having a threaded portion. The arrangement is such that the driving plate 228 and the base shaft connecting member 221 engage with each other at the notched portion 230 so as to move the optical pickup member 210 up and down, so that a constant distance is maintained between the disk 1 and the objective lens 231 of the optical pickup member 210. The base 212 is constantly urged in one direction by a spring 232. A tilt pin 233, which is arranged in parallel with the second support shaft 214 provided on the base 212, engages with a notch 235 in a tilt drive plate 234 which is provided on the pickup base member 216. A cam pin 236 provided on the tilt drive plate 234 engages with the cam groove 238 formed on a cam gear 237. The cam gear 237 is driven at a reduced speed by the power of a motor 340 through a worm 241 and a worm wheel 242 so as to operate the tilt driving plate 234 in the direction of the arrow D thereby rotating the same about the first and second support shafts 213 and 214. It is therefore possible to always keep the optical axis of the optical pickup member 210 perpendicular to the disk surface, regardless of any warp of the disk surface.

Figure 7:
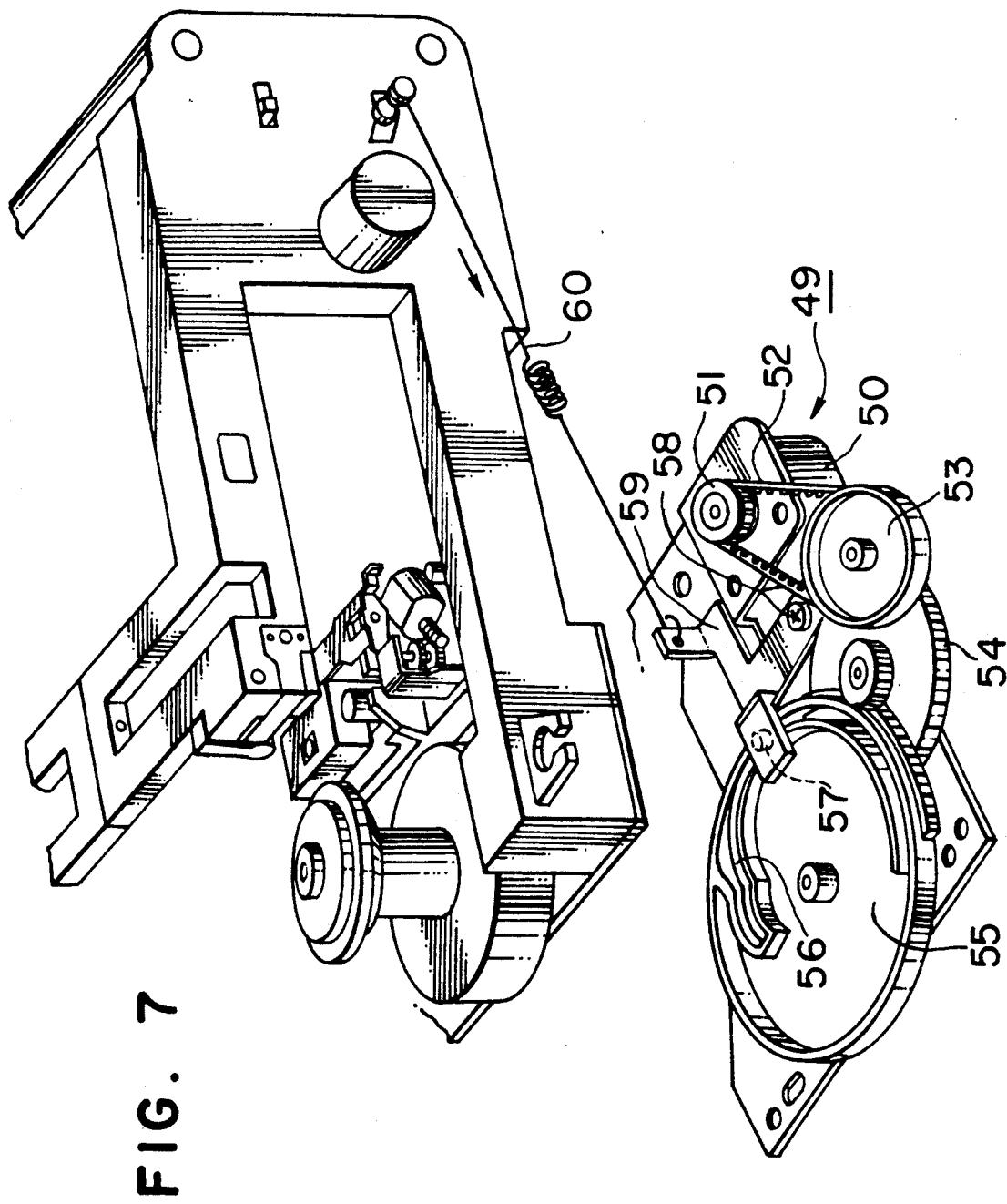
FIG. 7 is a perspective view of switching driving means.
Figure 8:
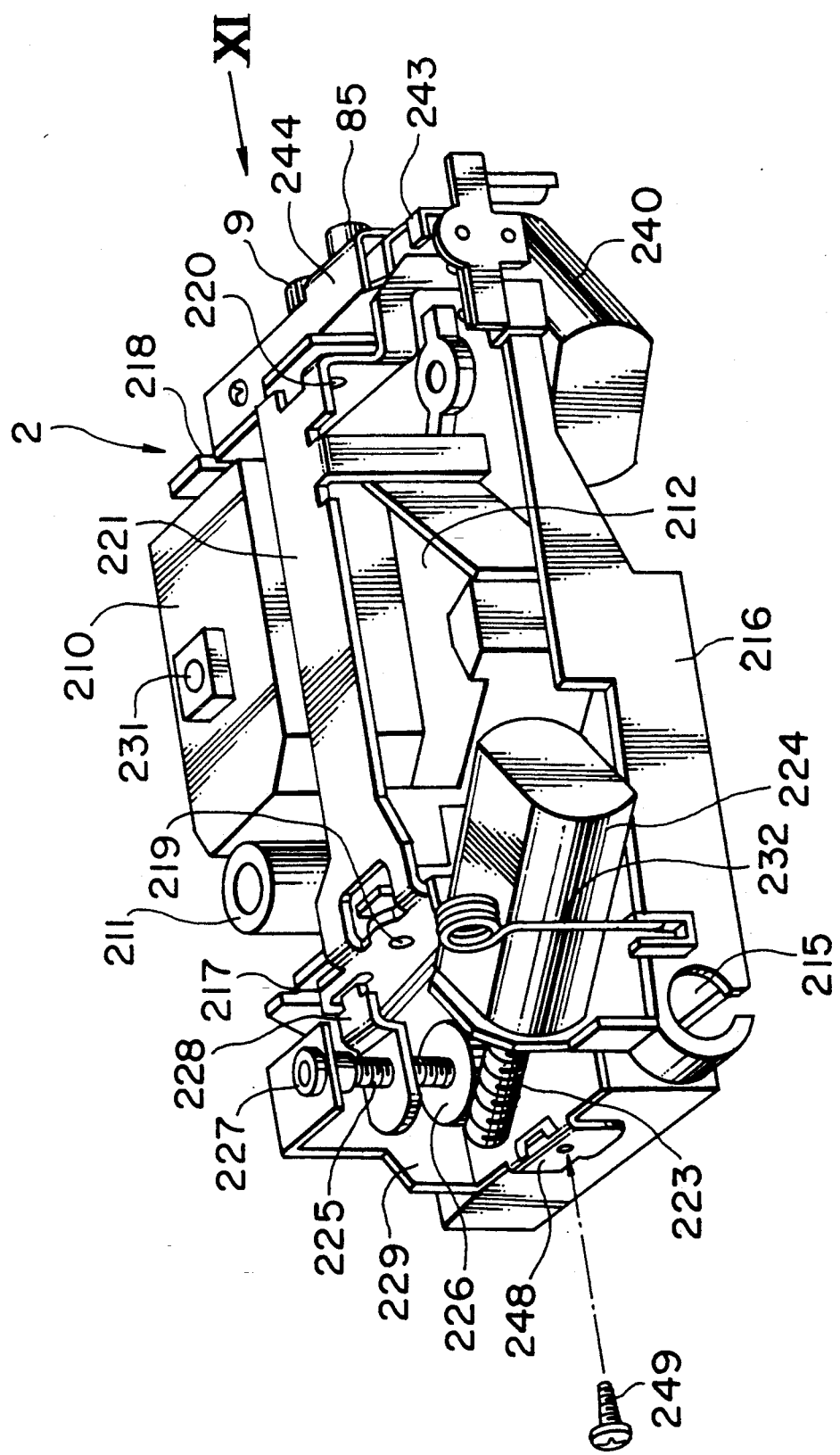
FIG. 8 is a perspective view of the optical pickup means.
Figure 9:
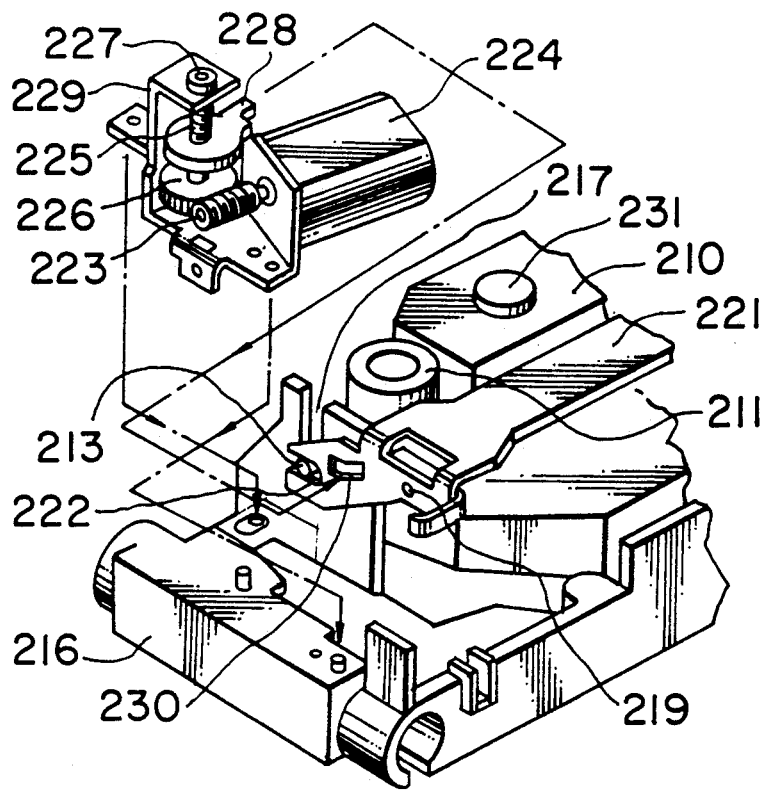
FIG. 9 is an illustration of an internal height adjusting mechanism in the optical pickup means.
Figure 10:
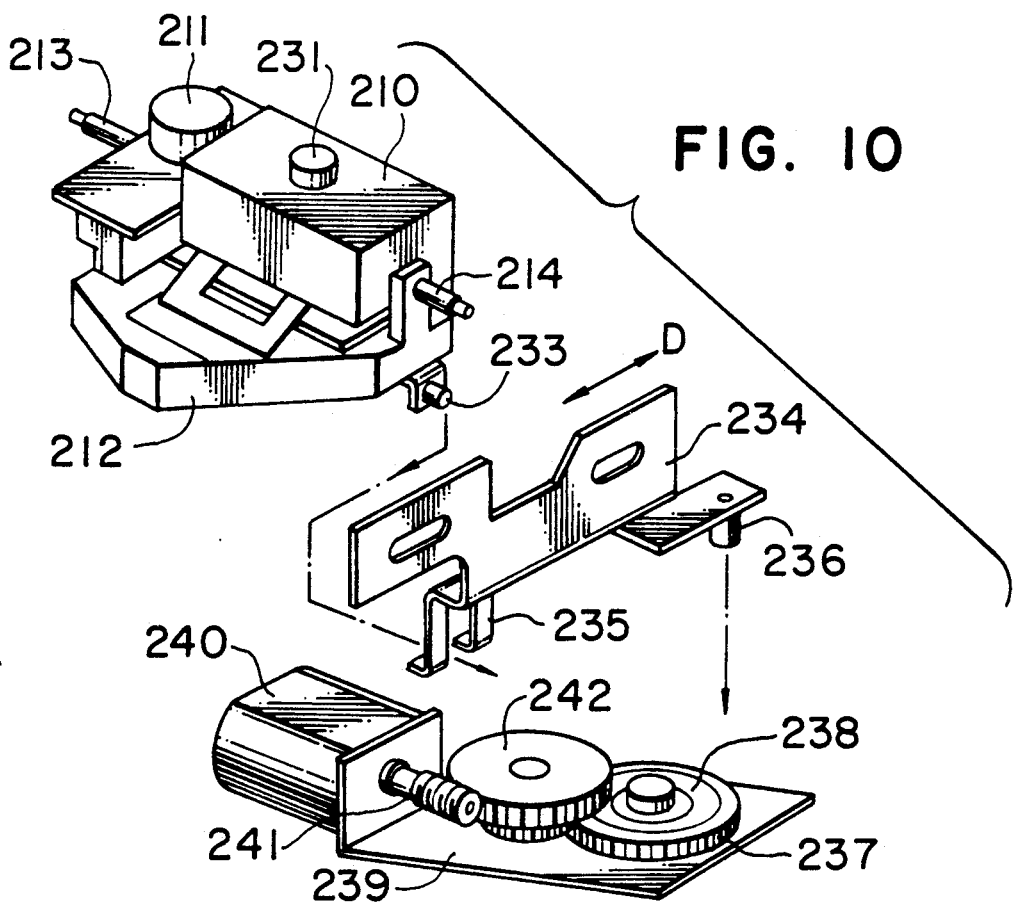
FIG. 10 is an illustration of a tilt mechanism inside the optical pickup means.
Figure 11:
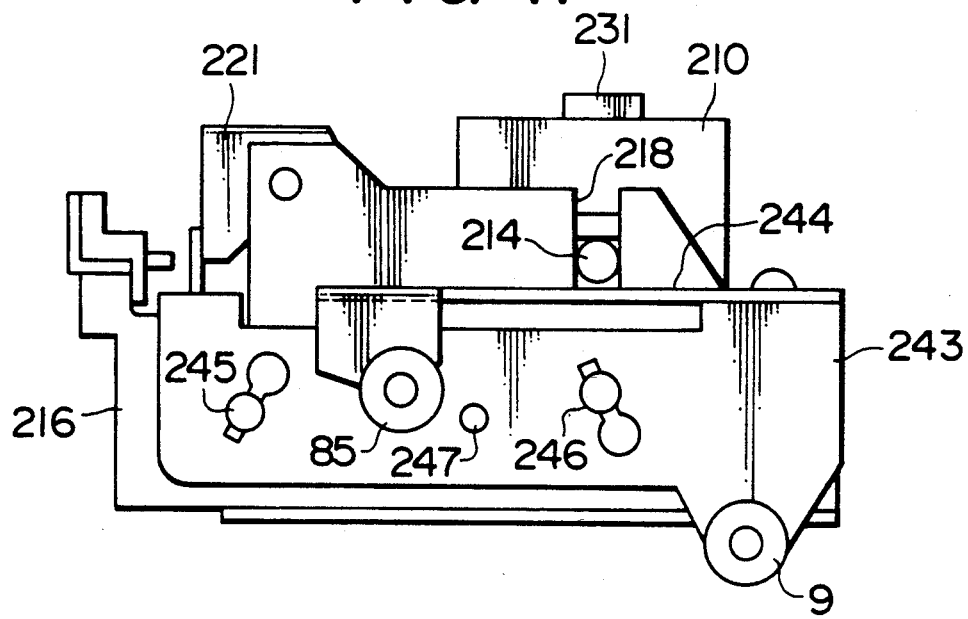
FIG. 11 is a side elevational view of the optical pickup means a viewed in the direction of an arrow C in FIG. 8.
Figure 12:
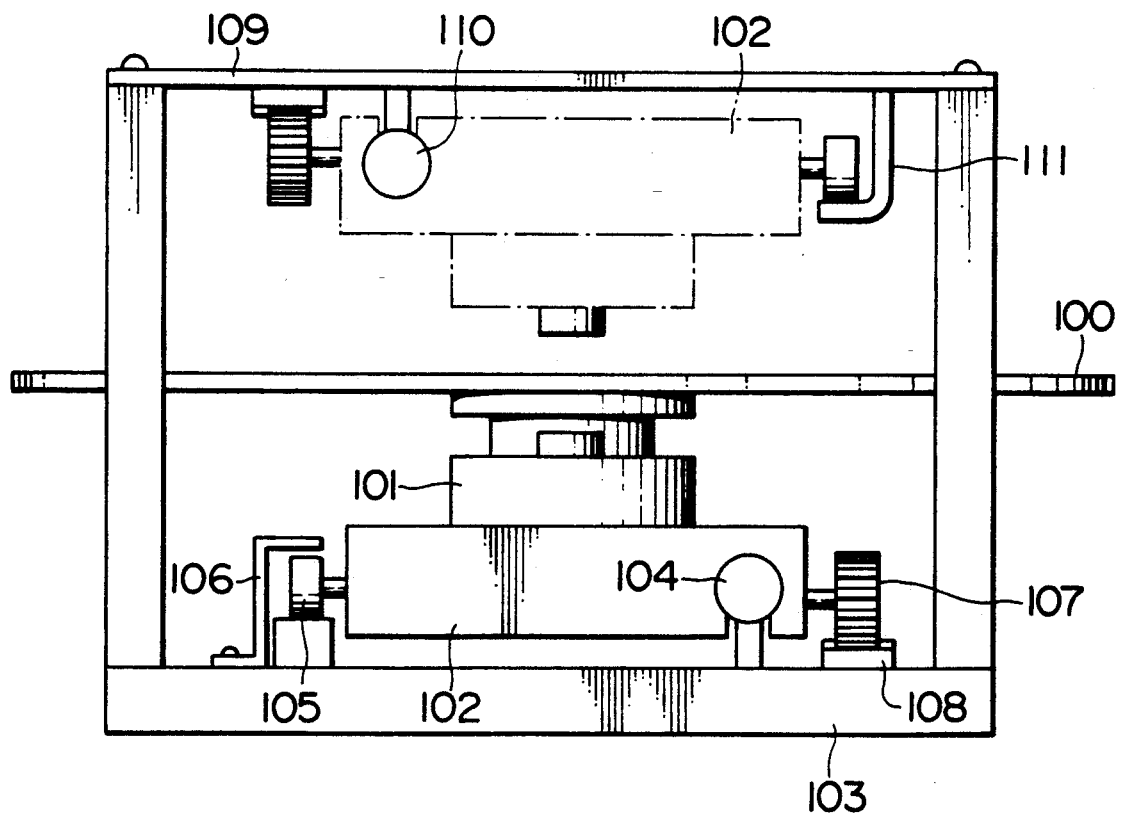
FIG. 12 is a schematic illustration of a conventional double-sided optical disk player.

As shown in FIG. 7, the pickup base member 216 carries a first roller base member 243 with the first roller 9, and a second roller base member 244 which is made of a flexible material and on which the aforementioned second roller 85 is provided. The first roller base member 243 is pivotable about a fulcrum 247 in the direction perpendicular to the plane of the drawing sheet while being restricted by guide pins 245, 246 which are provided on the end surfaces of the pickup base member 216, thus allowing a height adjustment of the first roller member 9. The height adjustment of the second roller base member 244 is conducted by utilizing flexing of this member.

The connecting member 18 fixed to the flexible transmission member 17 is connected to the end 248 of the vertical base member 229 and fixed thereto by means of a fixing member 249.

With the described arrangement, it is possible to ensure a high positional precision of the optical pickup means both for the first and the second sides of the disk, thus eliminating any substantial difference between the reproducing performance for the first side and the reproducing performance for the second side. In addition, the optical pickup means carries only a height adjusting mechanism and a tilt mechanism besides the optical pickup, and the driving of the optical pickup means in the radial direction of the disk is effected by a driving mechanism outside the optical pickup means. It is therefore possible to reduce the size of the optical pickup means and, hence, of the whole apparatus. Furthermore, since the movement of the optical pickup means is effected by the external driving mechanism through the flexible transmission member 17, vibration of the motor and other driving parts is not transmitted to the optical pickup 210, thus offering a high reliability of operation against vibration and noise.

The speed reduction ratio between the feed motor 1 and the driving pulley 25 is smaller than the speed reduction ratio between the feed motor 31 and the drive pulley 25. It is, therefore, possible to attain a high speed of switching of the optical pickup means from the state for reproduction from the first side to the state for reproduction from the second side and vice versa, as well as fine movement of the optical pickup means at each side of the disk ensuring a high resolution. It is thus possible to improve the performance of optical disk reproducing apparatus. In addition, the levels of vibration and noise can be reduced since the feed motor is allowed to operate at a low speed. Furthermore, the switching means for effecting switching between the first and the second sides can be effected without requiring any specific power source since the power is derived from the loading power source, thus contributing to a reduction in the cost.

As has been described, the present invention provides an optical disk reproducing apparatus which comprises an optical pickup means for recording or reproducing an information signal onto or from at least one of first and second sides of a disk-type recording medium, a disk driving means for rotatingly driving the disk-type recording medium, first guiding means for guiding the movement of the optical pickup means when the optical pickup means moves along the first side of the disk-type recording medium between the inner peripheral end and the outer peripheral end of the disk-type recording medium, second guiding means for guiding the movement of the optical pickup means when the optical pickup means moves along the second side of the disk-type recording medium between the inner peripheral end and the outer peripheral end of the disk-type recording medium, a first base member carrying the first and second guiding means, a second base member having a guide groove for guiding the movement of the optical pickup means and snugly fixed to the first base member, a flexible power transmission member for transmitting a power to the optical pickup means, a connecting member for connecting the optical pickup means and the flexible power transmission member to each other, an outer peripheral engaging portion of the first base member and engaging with the flexible power transmission member, a rotatable driving pulley having concentric first and second toothed portions of different diameters, a rotatable switching means having a switching gear disposed on the first base member so as to selectively engage with the first and second toothed portions of the driving pulley, urging means for urging the switching means in one direction, switch drive means for rotating the switching means so as to bring the switching gear into engagement with the first toothed portion or the second toothed portion of the driving pulley, an intermediate gear disposed on the axis of rotation of the switching gear and meshing with the switching gear, a pulley gear meshing with the intermediate gear, a feed motor provided on the first base member, and transmission means for transmitting the power of the feed motor to the intermediate gear.

With this arrangement, it is possible to ensure a high positional precision of the optical pickup means both for the first and the second sides of the disk, thus eliminating any substantial difference between the reproducing performance for the first side and the reproducing performance for the second side. In addition, the optical pickup means carries only a height adjusting mechanism and a tilt mechanism besides the optical pickup, and the driving of the optical pickup means in the radial direction of the disk is effected by a driving mechanism outside the optical pickup means. It is therefore possible to reduce the size of the optical pickup means and, hence, of the whole apparatus. Furthermore, since the movement of the optical pickup means is effected by the external driving mechanism through the flexible transmission member 17, vibration of the motor and other driving parts is not transmitted to the optical pickup member 210, thus offering a high reliability of operation against vibration and noise.

Furthermore, it is possible to attain a high speed of switching of the optical pickup means from the state for reproduction from the first side to the state for reproduction from the second side and vice versa, as well as fine movement of the optical pickup means at each side of the disk ensuring a high resolution. It is thus possible to improve the performance of optical disk reproducing apparatus. In addition, the levels of vibration and noise can be reducing since the feed motor is allowed to operate at a low speed.

What is claimed is:

1. An optical disc apparatus comprising:
    optical pickup means for recording and reproducing information signals on and from at least one of first and second sides of a disk-type recording medium;
    disk driving means for rotatingly driving said disk-type recording medium;
    pickup moving means for effecting radial movement of said optical pickup means at each of said first and second sides and also a movement of said optical pickup means from said first side to said second side of said disk-type recording medium and vice versa;
    first guiding means for guiding the movement of said optical pickup means along said first side of said disk-type recording medium between inner and outer peripheral ends of said disk-type recording medium;
    second guiding means for guiding the movement of said optical pickup medium between the inner and outer peripheral ends of said disk-type recording medium;
    a first base member carrying said first and second guiding means; and
    a second base member snugly fixed to said first base member and having a guide groove for guiding the movement of said optical pickup means, wherein said pickup moving means includes a flexible power transmission member for transmitting a power to said optical pickup means, a connecting member for connecting said optical pickup means and said flexible power transmitting member to each other, a driving pulley provided on the first base member and adapted for driving the flexible power transmission member, at least one idle pulley for changing a running direction of said flexible power transmission member, a feed motor provided on said first base member, and a speed reduction means for transmitting the power of said feed motor to said driving pulley.

2. An optical disk apparatus according to claim 1, wherein said driving pulley has a notched portion for snugly receiving said connecting member.

3. An optical disk apparatus according to claim 1, further comprising a plurality of rollers engaging with said guide groove in said second base member, and a transmission arm for engagement with one of said rollers and adapted to rotate as a unit with said driving pulley when said optical pickup means moves from a position for reproduction from the first side to a position for reproduction from the second side of said disk-type recording medium.

4. An optical disk apparatus according to claim 1, wherein said driving pulley has an output peripheral engaging portion for engagement with said flexible power transmission member and concentric first and second toothed portions of different diameters, said apparatus further comprising a rotatable switching means provided on said first base member and having a switching gear selectively engageable with said first and second toothed portions of said driving pulley, urging means for urging said switching means in one direction, switch driving means for rotatingly driving said switching means so as to cause said switching gear to move into engagement with said first or second toothed portion of said driving pulley, an intermediate gear provided on the axis of rotation of said switching gear and meshing with said switching gear, a pulley gear engaging with said intermediate gear, a feed motor provided on said first base member, and transmission means for transmitting a power output of said feed motor to said intermediate gear.

5. An optical disk apparatus according to claim 4, wherein said switch driving means includes a loading motor, a loading driving member having a cam portion, a rotatable driving plate mounting a cam follower for engagement with said cam portion, urging means arranged to engage with said switching means and said driving plate, and a speed reducing means through which the torque of said loading motor is transmitted to said loading driving member.

6. In an optical disk apparatus comprising an optical pickup means for recording and reproducing information signals on and from first and second sides of a disc-type recording medium, disc driving means for rotating said disc type recording medium, and pickup moving means for moving said pickup means radially of each of said first and second sides of said recording medium and for turning the pickup means from said first side onto said second side of said disc-type recording medium, and vice versa, the improvement wherein said pickup moving means comprises a drive pulley means having an outer periphery and adapted to be rotated by a drive motor, a flexible belt means for being stretched along both said first and second sides of said recording medium and wound around said outer periphery of said drive pulley means, and a coupling means attached to one end of said pickup means, for coupling said pickup means to said flexible belt means whereby when said drive pulley means is rotated by said drive motor, said flexible belt means is moved causing said pickup means to move along said first side of said disc-type recording medium for recording or reproducing, to turn from said first side onto said second side along the outer periphery of said drive pulley means, and to move along said second side of said recording medium for recording or reproducing, and vice versa.

7. An optical disc apparatus as set forth in claim 6, wherein said flexible belt means includes a timing belt having teeth formed thereon, and said drive pulley means includes teeth formed at said outer periphery for engagement with the teeth of said timing belt.

8. An optical disc apparatus as set forth in claim 6, wherein said drive pulley means includes a cut-out portion formed at said outer periphery to receive said coupling means when said pick-up means is moved along the outer periphery of the drive pulley means.

9. An optical disc apparatus as set forth in claim 6, further comprising a support means for supporting the other end of said pickup means, a member including a guide groove means for guiding said support means, and a transmission arm that moves integrally with said drive pulley means, said transmission arm having a recess in which said support means is received, when said pickup means is moved along the outer periphery of said drive pulley means.

10. An optical disc apparatus as set forth in claim 6, wherein said drive pulley means comprises a pulley that defines said outer periphery of said drive pulley means, said pulley having first and second ring gear parts respectively having different numbers of teeth formed thereon, a switching means having a switching gear and a gear portion coaxial with said switching gear, said switching means being swingable about an axis so as to selectively engage said gear portion with said first and second gear parts of said pulley, an urging means for urging said switching means toward one of said first and second gear parts of said pulley, a switching drive means for moving said switching means, while overcoming said urging means, so as to cause said gear portion to mesh with one of said first and second gear parts of said pulley, an intermediate gear located at said axis and meshed with said switching gear, a pulley gear member meshed with said intermediate gear, and a transmission means for transmitting a drive power from said drive motor to said pulley gear member.

11. An optical disc apparatus as set forth in claim 6, wherein said switching means comprises a loading motor, a loading drive member having a portion formed with a cam part, a drive plate having a cam follower provided thereon and engaged with said cam part, and a speed reduction means for transmitting torque from said loading motor to said loading drive member.

12. An optical disc apparatus as set forth in claim 7, further comprising a support means for supporting the other end of said pickup means, a member including a guide groove means for guiding said support means, and a transmission arm that moves integrally with said drive pulley means, said transmission arm having a recess in which said support means is received, when said pickup means is moved along the outer periphery of said drive pulley means.

* * * * *